United States Patent Office 2,893,858
Patented July 7, 1959

2,893,858
GRANULATION OF FERTILIZERS

Robert A. MacDonald, Highland Park, Ill., and Thomas H. Stewart, Atlanta, Ga., assignors to International Minerals & Chemical Corporation, a corporation of New York No Drawing. Application August 25, 1955
Serial No. 530,617

8 Claims. (Cl. 71—64)

This invention relates to the granulation of complete fertilizers. More particularly, it relates to the granulation of complete fertilizers utilizing sulfuric acid. Still more particularly, it relates to the granulation of mixed fertilizers wherein nitrogen is derived from urea-ammonia solutions.

Granulation of mixed fertilizers has been common practice for many years. Nitrogen has in the past been introduced as anhydrous ammonia for reaction with phosphoric acid or monocalcium phosphate constituents, ammonia partially neutralized with sulfuric acid and the partially neutralized solution sprayed into contact with additional sulfuric acid to form ammonium salts in situ or the nitrogen has been added in the form of ammonium nitrate-ammonia water solutions. Urea, on the other hand, while desirable because it introduces two moles of nitrogen or ammonia bound as part of a stable organic compound which does not dissociate in water as distinct from ammonium salts which do dissociate in the presence of water and give off gaseous ammonia at relatively low temperatures has been heretofore added as a solid because it has been widely understood that urea solutions could not be used due to hydrolysis or decomposition of urea when contacted with sulfuric acid at the relatively high temperatures encountered during granulation or during the drying of granulated fertilizers with consequent ammonia losses and reversions of phosphoric acid. Since some reaction occurs during pile storage of granulated mixed fertilizers with continued generation of heat, additional decomposition or hydrolysis of urea with loss of nitrogen occurred when the urea containing fertilizers were stored at temperatures over 130° F.

It is a primary purpose of this invention to overcome the shortcomings and disadvantages of granulation processes heretofore in use.

It is another object of this invention to provide a process wherein urea-ammonia solutions are utilized in the granulation of mixed fertilizers without appreciable losses.

It is still another object of this invention to provide a process where conditions are controlled so that urea and sulfuric acid can be simultaneously but separately introduced into mixtures of solid fertilizer ingredients.

It is still another object of this invention to provide a process showing substantially no hydrolysis of urea during hot or cool storage.

These and other objects of the invention will be apparent to those skilled in the art from the following description.

Briefly, the process of the instant invention comprises mixing fertilizer materials comprising phosphate and potash components with strong agitation, during agitation introducing a liquid nitrogenous component containing urea in solution, simultaneously but separately introducing acid solution, the moisture content of the mixing solids being maintained at a level such that the material discharged from the conditioner remains substantially as surface wetted particles interspersed with some crumbly aggregates as distinct from nodules having a consistency of soft modeler's clay. The wetted material is fed directly to a rotary dryer where the wetted particles are dried while tumbling in a drying atmosphere and the surface wetted particles becoming bonded together into multi-particle granules.

As has been previously pointed out, it has been past practice to add nitrogen in both liquid and solid form, the nitrogen incorporated by means of aqueous liquors being limited to a minor proportion of the total nitrogen of the mix with the nitrogen from urea being generally less than half the nitrogen introduced in aqueous form. Now, it has been discovered that contrary to previously held opinion, aqueous solutions of urea, urea and ammonia, urea and ammonium sulfate and ammonia, urea and ammonium carbonate and ammonia, and the like, can be utilized in the granulation of complete fertilizers, wherein the entire nitrogenous content added in liquid form is introduced in the relatively inexpensive mixture of aqueous solution even though strong acids will be present in the mixture. By the use of the term "ammonia" herein and in the accompanying claims, we mean to include ammonia alone as well as mixtures of ammonia and the simple neutral and basic ammonium compounds such as ammonium sulfate and ammonium carbonate.

This is accomplished in making complete fertilizers by mixing phosphate ingredients, such as superphosphate, triple superphosphate, dicalcium phosphate, with potash ingredients, such as potassium chloride, potassium carbonate, potassium sulfate, langbeinite and the like, and, if desired, inert material such as sand, limestone and the like, and organic matter such as tobacco stems and rice hulls.

The solid ingredients are agitated in a conditioner which may be of the rotary drum type or a pug mill type or equivalent apparatus. The solids and liquids are fed to this mixer-conditioner continuously and the rates of addition are such that holding time in the conditioner does not generally exceed 15 minutes, although certain mixtures have water content tolerances permitting longer holding times. Holding time in the mixer for wetted solids is preferably limited to between about 5 and about 10 minutes.

Nitrogenous material containing organic compounds, holding at least part of the nitrogen as bound nitrogen as distinguished from nitrogen ionizable in water solutions, is added to the solids being agitated in the form preferably of urea-ammonia water solutions. These solutions have part of the ammonia bound as part of an organic compound and part as free ammonia dissolved in aqueous solution. These solutions vary in urea content from about 26% to about 60%. The balance of the nitrogen in these solutions will in general show by analysis between about 28% and about 37% ammonia by weight and water content from about 17% to about 34%. While the above analyses show only ammonia, most solutions contain at least part of this ammonia in the form of ammonium compounds such as ammonium carbonate. A typical commercial solution will have 45.5% ammonia in a solution containing approximately 17.6% water. The nitrogen content of this solution is distributed with 20.2% of the nitrogen present in the urea and about 23% nitrogen present as free ammonia and about 2.5% of the nitrogen present as ammonium carbamate. Nitrogen is added to fertilizer mixes in quantities introducing generally between about 80 pounds of nitrogen and about 400 pounds of nitrogen, total, per ton of dry product, i.e., about 4% to about 20% nitrogen.

Useful components for introduction of nitrogen in aqueous solutions are urea, ammonium carbamate, biuret, carbamyl hydrazine and the like. By the use of the term "urea" herein and in the accompanying claims, we mean to include urea alone as well as the aforementioned analogous compounds of urea.

Simultaneously with the introduction of the nitrogenous solution or at a slightly later time, but separately and never before the addition of nitrogenous solution, an acid such as sulfuric acid, phosphoric acid and the like, is introduced into the mixing zone or into the mixing solids for reaction primarily with unabsorbed ammonia. The concentration of the acid used will depend upon the water tolerance of the particular fertilizer mixture, the quantity of nitrogenous solution added and its water content and upon the quantity of dried product usually "fines" recycled to the mixer-conditioner.

Condition of the admixture of solids and liquids upon discharge from the conditioner is critical to an economically feasible granulation operation. Primarily, the solids must consist of wetted particles, while such agglomerates as do occur should be of a soft crumbly nature showing that the solids are only thinly coated with aqueous reaction mixture and not run together into firm nodules in the form of clay-like masses having a consistency of soft modeler's clay. If the particles become too wetted, there is a marked reduction in the amount of ammonia absorbed and the granules take on a different character from that obtained when the granulation occurs predominantly during the drying period. This is believed due to the fact that wetness remains in the interior of material that is wetted to too great a degree and that this moisture is not driven out during drying and consequently there is a wet medium for reaction during storage which results in hydrolysis of the urea. When properly wetted, and proper temperatures are maintained in the mixer-conditioner, part of the moisture entering the mixer is evaporated from the mixing solids leaving a crumbly mass and then dried. The granular material formed in the dryer does not show the tendency during storage of temperature rise indicating continued chemical reaction. In general, acids such as sulfuric acid are added to the solids as aqueous solutions having a strength of between about 70% sulfuric acid and about 96% sulfuric acid.

Fine product from the usual screening operations may be returned to the conditioning operation in amounts varying from that required to control moisture content of the mix, for example, 5 to 15% by weight of the mix, to the entire amount of fines which in this type of granulation operation may vary from about 30% by weight to about 60% by weight of the final product. In the latter event, it will be recognized that the lower the nitrogen grade of the fertilizer, the greater the amount of water which must be added in the form of water alone or as sulfuric acid solution or combinations thereof. The preparation of higher nitrogen grade fertilizers presents less complicated control problems because of the larger quantities of water introduced by the nitrogenous solution.

The conditioning operation when using solutions such as urea-ammonia solutions as stated before is critical to successful operation. The nitrogenous solution in its intimate contact with mixing solids reacts therewith apparently before the pH adjustment due to the presence of strong acid becomes a dominant factor in the conditioning operation. In general, the particles cannot be wetted to the point of stickiness. Moisture must be distributed throughout the solids comparatively evenly. The moisture content to obtain the soft crumbly stage requisite for successful granulation when having urea in solution will vary from about 4% to about 16%, depending upon the ingredients being mixed and their moisture absorption characteristics.

Temperatures in the conditioner when reacting ammonia and, for example, sulfuric acid will vary with the amount of reactants and the quantity and temperature of the non-reacting materials. Temperature in the mixer will vary generally from about 150° F. to about 220° F.

From the mixer-conditioner, the crumbly mass goes to a rotary dryer generally of the lifter type where water is removed. Solids may flow countercurrent or concurrent to the flow of dry gases. The solids tumbled in the drying atmosphere agglomerate into hard pellets believed to be cemented together by crystallized ammonium sulfate and urea, although this theory is expressed without any intention that the invention be bound to the theory. This theory of crystallization, however, is consistent with the end result of substantially no heat rise during storage and, therefore, substantially no chemical reaction taking place after the drying operation. Dry warm pellets leave the dryer at a temperature in the range between about 170° F. and about 250° F.

The hot pellets are cooled in a rotary or other suitable type cooler before being transferred to storage. In the cooler, the pellets are lowered in temperature to between about 90° F. and about 140° F. In storage the particles at the interior of the storage pile may require several weeks to cool down to atmospheric temperature, but material prepared in accordance with applicants' invention show little or no tendency for rise in temperature in the initial stages of storage which rise would be an indication of continued reaction. The invention will be further understood by reference to the following examples.

*Example I*

540 parts by weight of ordinary superphosphate containing approximately 20% $P_2O_5$ was introduced into a rotary drum conditioner of 6 foot diameter and 6 foot length. The drum rotated at approximately 6 r.p.m. To this tumbling superphosphate was added 650 parts by weight of triple superphosphate having a $P_2O_5$ content of approximately 45%. Next there was added to the tumbling mass 670 parts by weight of potassium chloride of approximately 60% $K_2O$. This material was tumbled under conditions such that the product issued from the drum at a rate of approximately 10 tons per hour, the above parts by weight being given to indicate the ratio of components. To the above weight of mixing solids was added 220 parts by weight of urea-ammonia solution analyzing 45.5% nitrogen, 17.6% moisture, 20.2% nitrogen as dissolved urea, 25.3% nitrogen as ammonia. Simultaneously with the addition of the urea solution there was added 25 parts by weight of 60° Bé. sulfuric acid.

The wetted solids were dried in a rotary kiln dryer having lifters to elevate the solids and drop them thru the hot drying gases. Solids from the conditioner or drum entered the dryer at a temperature of approximately 150° F., passed through the dryer in approximately 15 minutes and issued therefrom at a temperature of approximately 190° F. The granules issuing from the dryer were cooled to approximately 100° F. and delivered to storage. Screen analysis of this material issuing from the cooler showed approximately 70% of the material bound as granules having a particle size in the range between about 4 mesh and about 20 mesh (U.S. standard screen size), the balance being fines which were recycled to the mixer conditioner drum. Analysis of the material introduced into the mix and the amount of nitrogen determined by the Kejldahl method indicated a recovery in the stored material when averaging a number of different runs of the order of 98% recovery of urea, the variation being between about 96% and about 98% recovery.

*Example II*

1000 parts by weight of ordinary superphosphate containing approximately 20% $P_2O_5$ was introduced into a rotary drum conditioner at 6 foot diameter and 6 foot length. The drum rotated at approximately 6 r.p.m. Next there was added to the tumbling mass 335 parts by weight of potassium chloride of approximately 60% $K_2O$ and 600 parts by weight of −20 mesh dry product. This material was tumbled under conditions such that the product issued from the drum at a rate of approximately 10 tons per hour, the above parts by weight being given to indicate the ratio of components. To the above weight of mixing solids was added 444 parts by weight of urea-ammonia solution analyzing 45.5% nitrogen, 17.6% moisture, 20.2% nitrogen as urea, 25.3% nitrogen as ammonia. Simultaneously with the addition of the urea solution there was added 330 parts by weight of 60° Bé. sulfuric acid. The wetted solids were dried as in Example I.

*Example III*

1000 parts by weight of ordinary superphosphate containing approximately 20% $P_2O_5$ was introduced into a rotary drum conditioner of 6 foot diameter and 6 foot length. The drum rotated at approximately 6 r.p.m. To this tumbling superphosphate was added 275 parts by weight of ammonium sulfate. Next there was added to the tumbling mass 335 parts by weight of potassium chloride of approximately 60% $K_2O$. This material was tumbled under conditions such that the product issued from the drum at a rate of approximately 10 tons per hour, the above parts by weight being given to indicate the ratio of components. To the above weight of mixing solids was added 320 parts by weight of urea-ammonia solution analyzing 45.5% nitrogen, 17.6% moisture, 20.2% nitrogen as urea, 25.3% nitrogen as ammonia. Simultaneously with the addition of the urea solution there was added 180 parts by weight of 60° Bé. sulfuric acid. The wetted solids were dried as in Example I.

*Example IV*

1,050 parts by weight of ordinary superphosphate containing approximately 20% $P_2O_5$ was introduced into a rotary drum conditioner of 6 foot diameter and six foot length. The drum rotated about 6 r.p.m. To this tumbling superphosphate was added 534 parts by weight of potassium chloride of approximately 60% $K_2O$. This material was tumbled under conditions such that the product issued from the drum at a rate of approximately 10 tons per hour, the above parts by weight being given to indicate the ratio of components. To the weight of mixing solids was added 352 parts by weight of urea-ammonia solution analyzing 45.5% nitrogen, 17.6% moisture, 20.2% nitrogen as dissolved urea, 25.3% nitrogen as ammonia, balance as $CO_2$ and other non-nitrogen materials. Simultaneously with the addition of the urea solution there was added 203 parts by weight of 75% phosphoric acid having a $P_2O_5$ content of approximately 54.4% and 25 parts by weight of 60° Bé. sulfuric acid. The wetted solids were dried and screened as in Example I. The phosphoric acid granulation products were equally as satisfactory as the granules made using sulfuric acid.

Having thus described our invention, what we claim is:

1. The process of granulating complete fertilizers wherein the entire nitrogenous content added in liquid form is introduced by means of an aqueous nitrogenous solution having at least one substance selected from the group consisting of a mixture of urea and ammonia, and urea alone, which comprises mixing solid fertilizer components comprising predominantly phosphate and potash constituents, thereafter introducing simultaneously but separately, said aqueous nitrogenous solution and an aqueous sulfuric acid solution consisting essentially of sulfuric acid and water into direct contact with the mixing solids, said sulfuric acid being added in sufficient amount to neutralize and react with the unreacted nitrogeneous compounds present, maintaining the moisture content of the mixing solids between about 2% and about 15%, whereby the material discharged from the conditioning step remains substantially as wetted particles and crumbly aggregates of particles, and directly thereafter heating the conditioned material while tumbling same in a drying atmosphere, whereby substantially all of the added urea constitutent is retained, without substantial hydrolysis, in the final product.

2. A process as in claim 1 in which the aqueous nitrogenous solution is an aqueous mixture of urea and ammonia.

3. A process as in claim 1 wherein the aqueous nitrogenous solution is a urea solution.

4. A process as in claim 1 wherein the added sulfuric acid solution has a strength between about 70% and about 98% sulfuric acid.

5. The process of granulating complete fertilizers wherein the entire nitrogenous content added in liquid form is introduced by means of an aqueous nitrogenous solution having at least one substance selected from the group consisting of a mixture of urea and ammonia, and urea alone, which comprises mixing solid fertilizer components comprising predominantly phosphate and potash constituents, thereafter introducing simultaneously but separately, said aqueous nitrogenous solution and an aqueous sulfuric acid solution consisting essentially of sulfuric acid and water into direct contact with the mixing solids, said sulfuric acid being added in sufficient amount to neutralize and react with the unreacted nitrogeous compounds present, maintaining the moisture content of the mixing solids between about 2% and about 15%, whereby the material discharged from the conditioning step remains substantially as wetted particles and crumbly aggregates of particles, and directly thereafter heating the conditioned material while tumbling same in a drying atmosphere having a temperature sufficient to maintain the solids temperature in the range between about 150° and about 220° F., whereby substantially all of the added urea constituent is retained, without substantial hydrolysis, in the final product.

6. A process as in claim 5 in which the aqueous nitrogeous solution is an aqueous mixture of urea and ammonia.

7. A process as in claim 5 wherein the aqueous nitrogenous solution is a urea solution.

8. A process as in claim 5 in which the aqueous nitrogenous solution is a solution of urea and ammonia having a strength of about 43.5% nitrogen in solution and containing approximately 17.6% water, and wherein the sulfuric acid employed is of about 96% strength.

References Cited in the file of this patent

UNITED STATES PATENTS

| | | |
|---|---|---|
| 2,287,759 | Hardesty et al. | June 23, 1942 |
| 2,618,546 | Davenport | Nov. 18, 1952 |
| 2,618,547 | Davenport | Nov. 18, 1952 |
| 2,680,680 | Coleman | June 8, 1954 |
| 2,729,554 | Nielsson | Jan. 3, 1956 |
| 2,766,283 | Darden | Oct. 9, 1956 |